United States Patent
Cok et al.

(10) Patent No.: US 6,370,280 B1
(45) Date of Patent: Apr. 9, 2002

(54) SECURE PRODUCTION OF COMPOSITE IMAGES

(75) Inventors: Ronald S. Cok; John Randall Fredlund, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 984 days.

(21) Appl. No.: 08/586,081

(22) Filed: Jan. 16, 1996

(51) Int. Cl.$^7$ .................................................. G06K 9/36
(52) U.S. Cl. ...................................... 382/284; 358/450
(58) Field of Search ................................ 382/284, 217; 358/487, 450, 449, 506, 527, 401, 470

(56) References Cited

U.S. PATENT DOCUMENTS

| | | | |
|---|---|---|---|
| 4,740,890 A | 4/1988 | William | 364/200 |
| 5,179,649 A | * 1/1993 | Masuzaki | 395/148 |
| 5,214,696 A | 5/1993 | Keiser, II et al. | 380/4 |
| 5,343,526 A | 8/1994 | Lassers | 380/4 |
| 5,459,819 A | 10/1995 | Watkins et al. | 395/117 |
| 5,608,542 A | * 3/1997 | Krahe et al. | 358/449 |

* cited by examiner

Primary Examiner—Jerome Grant, II
(74) Attorney, Agent, or Firm—Thomas H. Close

(57) ABSTRACT

A system for producing composite images, includes: a digital image file containing a personal image and image control data related to the personal image; a digital image file containing an image template and image template control data related to the image template; a file containing composite image construction rules and composite control data related to the image construction rules; and an image production system including, a production rule data file, a control module for: receiving a customer order including customer order control data; retrieving the image control data, the image template control data, the composite control data and the production rule data; and generating an ENABLE/DISABLE control signal, and a composite image production module responsive to the ENABLE/DISABLE control signal for employing the personal image, the image template, and the construction rules to produce the composite image.

16 Claims, 2 Drawing Sheets

SECURE PRODUCTION OF COMPOSITE IMAGES

FIELD OF THE INVENTION

The present invention relates to a method and apparatus for controlling the production of composite images based on consumer imagery, background image templates, order source, and fulfillment mechanism. Such a method provides security to the consumer, template owner, and production company.

BACKGROUND OF THE INVENTION

Composite images are created by combining images from different sources into one final result. The images may be combined for artistic, informational, or emotional reasons, and result in a single image with more value than its component parts. This composite image may be written onto a variety of media such as photographic paper, photographic transparency film, thermal paper, transfer media for transferring the composite image to an article, such as a T-shirt or coffee mug, etc. For example, see U.S. Pat. No. 5,459,819, issued Oct. 17, 1995 to Watkins et al. The image sources are highly variable; some may be professionally designed and subject to copyright restrictions or royalty payment, others may be in the public domain, while others may be based on personal images that may not be accessible to the public. Each of these image components, and the final composite image, has different security needs. Moreover, the professional image owners' need to maximize their commercial return by widely distributing their imagery to a variety of producers, only compounds the complexity of the situation.

Copyright control of artistic works is a critical part of the value of that work. Digital systems that manipulate or otherwise utilize digitized artworks must support this copyright control. Likewise, consumers who submit personal images for production by others have an expectation of privacy for those images. The composite images may be owned by yet another party and may contain licensed properties (characters, logos, names etc.). In any case, systems which legitimately maintain such images have an obligation to secure those images from unauthorized reproduction.

Thus, composite image creation systems based on the reproduction of copyrighted imagery combined with personal imagery must prevent unauthorized production. Since the sources of the imagery may be diverse, and legitimate production is possible in many ways, maintaining appropriate control of production can be difficult. This is compounded by the need for a production system to maintain a library of images together with compositing instructions, each of which may have different restrictions associated with it and whose restrictions may vary over time and with the particular producer.

Two areas in which security is also important are the transmission of image information and access to that information. The first is dealt with by encryption of the image data while the second area can be addressed with traditional computer system security measures. Neither of these areas is addressed by the present invention.

When creating composite images, the sources may be freely available, available for a cost, or restricted to particular circumstances or users. In the first case, no special security is needed. In the second case, a production system has the obligation to verify that the system has the right to produce a product and to make any appropriate royalty payments. In the third case, the use of the image may be restricted for some products, but not for others. For example, the author of a professional image may want to restrict the image from being reproduced on a particular medium, such as a T-shirt, or to restrict the reproduction to a particular time period, such as during a holiday season. There may also be a need to restrict the use of an image to particular image production systems.

Artistic works are typically licensed for use on a royalty basis and may be licensed to a variety of production systems with different access restrictions. The licensing or production of artistic works can vary depending on the artist, the work, the business utilizing the art work, the end consumer, the date, and the subject, among other criteria. Maintaining a strict control of production can become very complex. Moreover, the reproduction of these composite images is unfortunately subject to fraud.

Likewise, the use of personal images must be limited to products incorporating those images approved by the person himself. Any production system must maintain controls so that other systems or other persons may not utilize those images.

It is the object of this invention to provide a method for controlling the use of artistic and personal images in composite imagery in a manner that is very flexible, is useful over a wide distribution to diverse producers, inhibits fraud, and can adapt to a variety of circumstances without compromising the secure use of the imagery.

SUMMARY OF THE INVENTION

The present invention is directed to overcoming one or more of the problems set forth above. Briefly summarized, a system for producing composite images, includes: a digital image file containing a personal image and image control data related to the personal image; a digital image file containing an image template and image template control data related to the image template; a file containing composite image construction rules and composite control data related to the image construction rules; and an image production system including, a production rule data file, a control module for: receiving a customer order including customer order control data; retrieving the image control data, the image template control data, the composite control data and the production rule data; and generating an ENABLE/DISABLE control signal, and a composite image production module responsive to the ENABLE/DISABLE control signal for employing the personal image, the image template, and the construction rules to produce the composite image.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

The present invention employs control data describing the provenance of composite image components used in the production of composite images. The control data are embedded in the data sources accessed by an image production system. The image production system determines whether the image composite may be produced by comparing the control data with production rule data. Individual identifiers for each image template, construction rule, personal consumer order, and personal image are provided.

Figure 1:
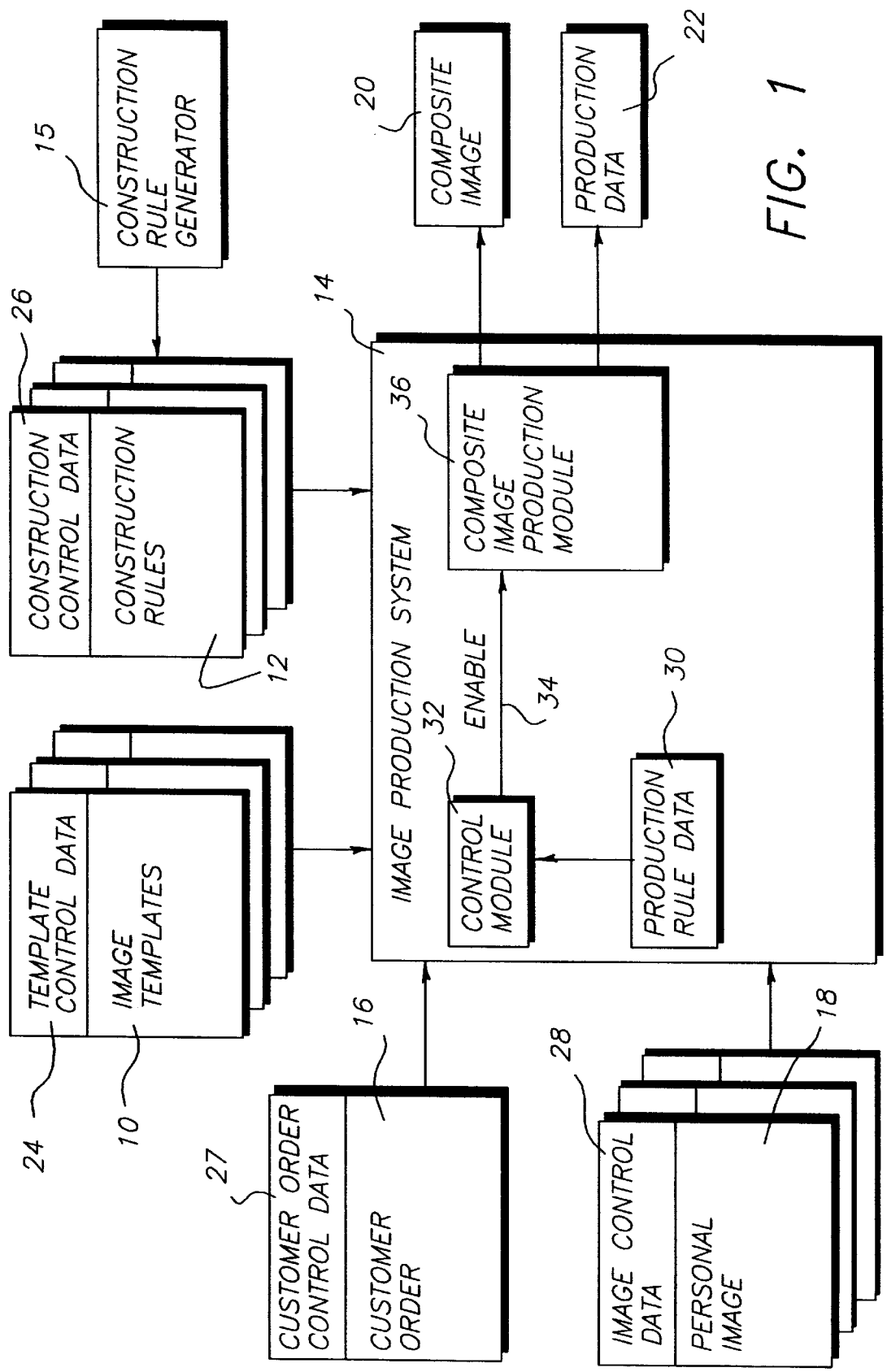
FIG. 1 is a functional block diagram of a system for producing composite images according to the present invention.

Referring to FIG. 1, image templates 10 and construction rules 12 are created and communicated to the composite image production system 14. An image template 10 consists of a digital image background designed for integration with personal images. Image templates are generally produced and licensed by professional artists, such as photographers and graphic artists and may include, for example, professional photographs, graphic art and text, with locations for inserting personal images. Construction rules 12 designate a particular image template or templates 10, and describe the integration procedure, image and text positioning, font types, formatting, etc. employed to produce the composite image product. The construction rules are generated by a construction rule generator 15. The construction rule generator 15 provides a graphic user interface for an artist to generate a new construction rule employing existing image templates for producing a composite image. The image templates 10 and construction rules 12 are stored in a digital memory associated with the image production system 14.

A customer order 16 together with personal images 18 are input to the image production system 14 to create the composite image 20. The customer order 16 specifies a composite image product to be produced with the personal images 18 according to a specific set of construction rules 12. The production system 14 creates the composite image 20 (subject to the conditions described below), and outputs any pertinent production data 22 (such as usage information for royalty collection purposes).

The following features are provided by the image production system of this invention. Any use of image templates is recorded for possible royalty payment; the use of an image template may be inhibited depending on the artist who created it, the commercial source or the distributor of the templates. Personal images cannot be used for any purpose other than the production of composite images for that person. The production of any composite may be inhibited depending upon the source of the order, a particular output media, or the production of any composite may be inhibited in its entirety by the composite image production system alone. The control of production is supported by the manufacturer of the image production system and maintained by the owner of the production system.

Control of production is enabled by integrating the following control data into the information used by the production system. The template control data 24 associated with each image template 10 includes data relating to:

1) Owners of copyrights on image templates, the owner of a professional image template is the copyright holder and has a unique identifier; and
2) Template image distributor, the distributor of an image template is that business permitted to license the use of libraries of professional imagery for multiple owners and to multiple producers.

The construction rule control data 26 associated with each construction rule 12 includes:

1) The artist creating the construction rule, the creator of the construction rule is uniquely identified and may have copyrights in addition to the templates employed by the construction rule (or may be the same person or business);
2) Output media code for specifying allowable output media, those output media to which an image template called for by the construction rule may be applied;
3) Serial number of construction rule generator used to create the construction rules for the composite image product; and
4) Serial number of the construction rule employed to produce the composite image.

The customer control data 27 associated with order 16 includes:

1) Serial number of the customer order entry station used to create the order;
2) Business owner of customer order entry station used to create order; and
3) Customer identification.

The image control data 28 associated with each personal image 18 includes:

1) Personal image code identifying the image as a personal image.

The image production system 14 includes a production rule data file 30 that contains data describing the control of composite image production. This data is used by a control module 32 to cause the ENABLE/DISABLE control signal 34 to assume its ENABLE state whenever a customer order can be produced, or to assume its DISABLE state to prevent the customer order from being produced when a production rule will be violated. The production rule data 30 includes a production system identifier that uniquely identifies the production system 14. The control module 32 receives the customer order 16 and image control data 28, retrieves the appropriate construction control data 26 and template control data 24 associated with the order, and employs the rules in the production rule data 30 to generate the ENABLE/DISABLE control signal 34.

When the ENABLE/DISABLE control signal 34 is in its ENABLE state, a composite image production module 36 creates the composite image 20 using the appropriate construction rules 12 for the composite image product specified in the customer order, image template(s) 10 specified by the construction rules, and personal image 18. The image production module 36 also generates production data 22 upon production of the composite image 20. Thus, using the various control data and the production rule data, the image production system 14 controls production to enable authorized production of composite images or to inhibit unauthorized production.

The production rule data base or specific portions thereof may be password protected so that only the system provider can make changes to the data in these portions. For example, in this way, the system provider may exercise exclusive control over production of specific products or use of specific classes of images.

The production rule data 30 includes rules related to:

1) Owner of image template, all owners of image templates used in the production system are listed together with a TRUE or FALSE value indication to determine whether production is ENABLED or DISABLED for that owner;
2) Artist creating construction rule, all artists creating construction rules used in the production system are listed together with a TRUE or FALSE indication to determine whether production is ENABLED or DISABLED for that artist;
3) Distributor of image templates, all distributors of image templates used in the production system are listed together with a TRUE or FALSE indication to determine whether production is ENABLED or DISABLED for that distributor;

4) Output product code for image templates, all image templates are listed together with the enabled product types;

5) Serial number of construction rule generator used to create the construction rules, the serial number for each construction rule generator used to create construction rules is listed as ENABLED or DISABLED;

6) Serial number of order entry station used to create order; the serial number for each order entry station used to create personal orders is listed as ENABLED or DISABLED;

7) Business owner of order entry station used to create order; the identifier for each business which creates personal orders is listed as ENABLED or DISABLED;

8) Personal image code; personal image codes must match the customer identification;

9) Production system identifier; the identifier for each business which operates a production system is listed as ENABLED or DISABLED;

10) Producer credit information, a control code relevant to the producers credit status is listed as ENABLED or DISABLED;

11) Product expiration dates, the current date is compared with the product expiration date to produce the ENABLED or DISABLED control signal;

12) Geographic distribution, a control code relevant to the products geographic status is listed as ENABLED or DISABLED;

13) Class of trade; a control code relevant to the product's class of trade is listed as ENABLED or DISABLED; and 14) Event specific restrictions; a control code relevant to the products event status is listed as ENABLED or DISABLED.

In addition to these rules, some production systems may need a more detailed control structure for particular attributes of some imagery. This invention is understood to include other, similar mechanisms for controlling the composition of imagery from a variety of sources. For example, particular groups of consumer images or image templates might be classified, coded, and produced under pertinent rules. This provides a more detailed ability to control production for various types of images.

Figure 2:
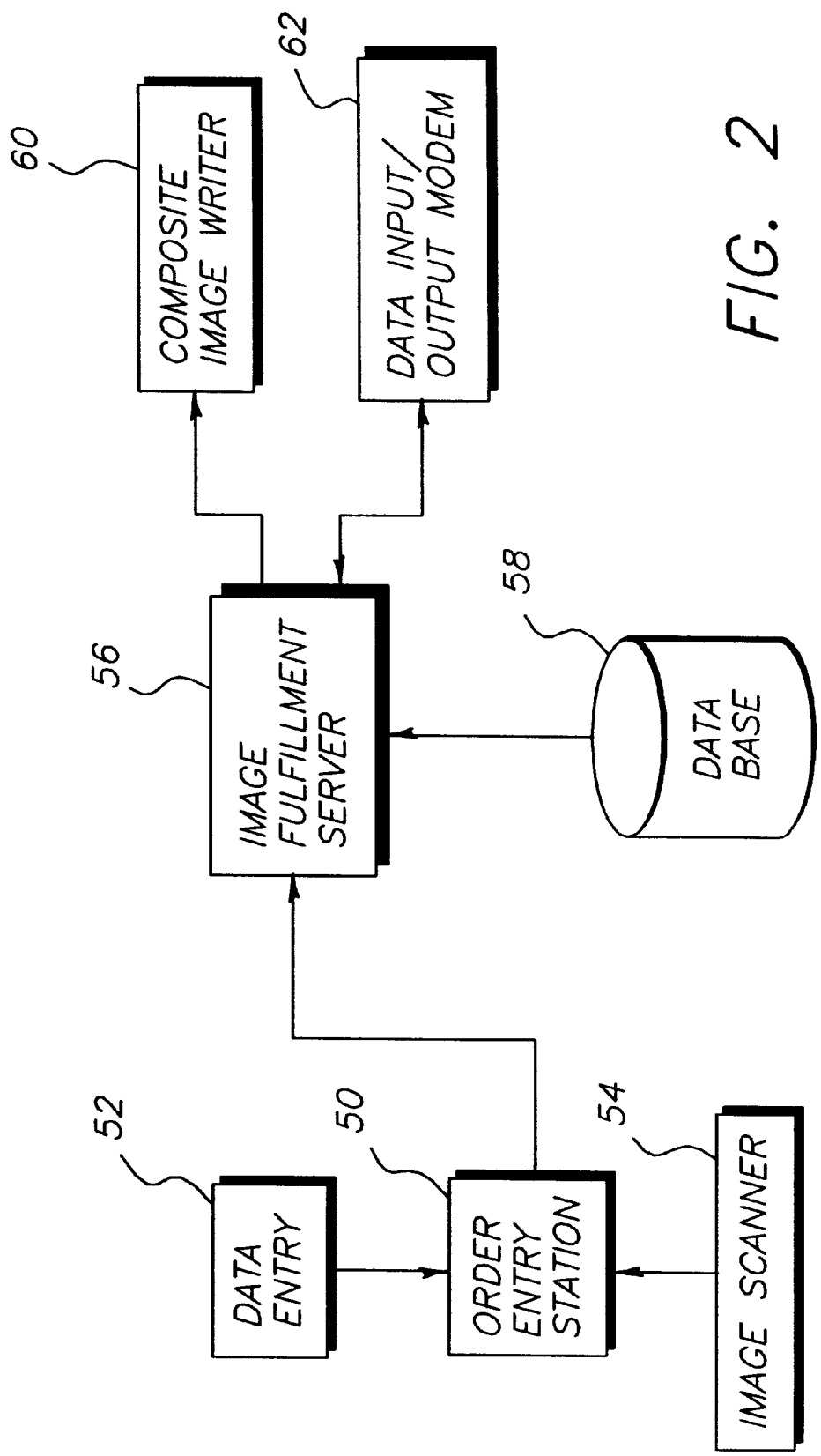
FIG. 2 is a block diagram of a hardware arrangement for implementing the system of the present invention.

Referring to FIG. 2 a hardware configuration suitable for implementing the invention is shown. The hardware configuration includes an order entry station 50, such as a programmed personal computer with a data entry device such as a keyboard or a touch screen 52. An image scanner 54 for scanning personal images, such as a flatbed scanner for photographic prints or a film scanner for photographic film is connected to the order entry station 50. The order entry station 50 is connected to an image fulfillment server 56 that implements the image production system 14. The connection may be via a local network connection, or remote connection via standard telecommunications networks. Alternately, the data from the order entry station 50 may be recorded on magnetic medium and physically transported to the image fulfillment server 56 (sneaker net). The image fulfillment server 56 is a multitasking server computer workstation with an associated mass storage unit 58 such as a magnetic or optical disc drive. A composite image writer 60, such as a thermal or CRT printer is connected to the image fulfillment server via standard computer interface to produce a hardcopy of the composite image 20. The image fulfillment server transmits and receives billing and credit information over data input/output modem 62.

Advantages

By applying the production rules to the control data according to the present invention, a particular production system can be enabled or disabled, sources of imagery and distributors can be independently enabled or disabled, production application of image templates can be maintained, and personal imagery secured. By changing the rule database, the system provider can readily change the available images, image sources, credit information, enable and disable information on templates and providers etc.

In addition to security, this system provides great flexibility to the producers of composite images. Individual producers can independently create templates, by use of tools which record the template source, and use the templates created either internally or licensed from other creators. These templates can either bear royalty or not, as the creator sees fit. Alternatively, producers may rely on a single source for all templates. In any case, by employing the appropriate control data and production rules according to the present invention, a producer can easily tailor the production of composite images to his or her own needs while providing for the security and property interests of the various owners of the images and templates. The collection of royalty information may be easily centralized, since an individual production system will monitor all of its own production regardless of the template source and report the template use via the production data.

It is also possible to use only professional images within the image templates. In this case, personal image control data will not be used, while the recording of royalty information for the professional images continues to be supported.

The use of this method in the manner described when applied to the production of composite images effectively supports secure production in flexible environment. Security is maintained for the owners of professional imagery, any personal imagery, and the production system itself.

This method for the control of image composite production when using images from a variety of sources and produced at a third, provides a flexible structure for the imposition of production controls. The controls can be varied by professional image producer, by personal image customer, and by production system for each of the images or systems in use. The method is simple to implement, to update, and to control. It provides extensive business flexibility and supports copyright protections.

The invention has been described with reference to a preferred embodiment. However, it will be appreciated that variations and modifications can be effected by a person of ordinary skill in the art without departing from the scope of the invention.

PARTS LIST 10 image templates
12 construction rules
14 composite image production system
15 construction rule generator
16 customer order
18 personal images
20 composite image
22 production data
24 template control data
26 construction rule control data 27 customer control data
28 image control data
30 production rule data file
32 control module
34 ENABLE/DISABLE control signal
36 image production module
50 order entry station
52 data entry device
54 image scanner
56 image fulfillment server
58 mass storage unit
60 composite image writer
62 data input/output modem

What is claimed is:

1. A system for producing composite images, comprising:
   a) a digital image file containing a personal image and image control data related to the personal image;
   b) a digital image file containing an image template and image template control data related to the image template;
   c) a file containing composite image construction rules and composite control data, related to the image construction rules; and
   d) an image production system including,
      i) a file containing production rule data including data indicating whether production is enabled or disabled;
      ii) a control module for: receiving a customer order including customer order control data; retrieving the image control data, the image template control data, the composite control data and the production rule data; and generating an ENABLE/DISABLE control signal by comparing the production rule data with the image control data, the image template control data and the composite control data to generate the ENABLE/DISABLE control signal; and
      iii) a composite image production module responsive to the ENABLE/DISABLE control signal for employing the personal image, the image template, and the composite image construction rules to produce the composite image.

2. The system for producing composite images claimed in claim 1, wherein the image template control data includes data selected from the group consisting of: identification of copyright owner; and identification of image template distributor, and combinations thereof.

3. The system for producing composite images claimed in claim 1, wherein the construction rule control data includes data selected from the group consisting of: identification of the artist who created the construction rule; identification of allowable output media; identification of a construction rule generator used to create the construction rule; and identification of the particular construction rule, and combination thereof.

4. The system for producing composite images claimed in claim 1, wherein the customer control data includes data selected from the group consisting of: identification of a customer order entry station used to create the order; identification of the business owner of the customer order entry station; and identification of a customer, and combinations thereof.

5. The system for producing composite images claimed in claim 1, wherein the image control data includes data identifying the image as a personal image.

6. The system for producing composite images claimed in claim 1, wherein the production rule data includes data selected from the group consisting of: identification of the production system; identification of image template owners for whom production is enabled or disabled; identification of artists creating construction rules for whom production is enabled or disabled; identification of distributors of image templates for whom production is enabled or disabled; identification of enabled product types for each image template; identification of construction rule generators for which production is enabled or disabled; identification of order entry stations for which production is enabled or disabled; identification of business owners of order entry stations for production is enabled or disabled; identification of customers and corresponding personal image codes; identification of production systems for which production is enabled or disabled; producer credit status; product expiration dates after which production of a product is disabled; geographical distribution for which production of a product is enabled or disabled; class of trade for which production of a product is enabled or disabled; and specific events for which a product is enabled or disabled, and combinations thereof.

7. The system for producing composite images claimed in claim 1, wherein the composite image production module includes means for reporting production information, including billing for use of a copyright.

8. The system for producing composite images claimed in claim 1, wherein the file containing production data is password protected.

9. A method of producing composite images in an image production system, comprising the steps of:
   a) providing a digital image file containing a personal image and image control data related to the personal image;
   b) providing a digital image file containing an image template and image template control data related to the image template;
   c) providing a file containing composite image construction rules and composite control data related to the image construction rules;
   d) providing a file containing production rule data including data indicating whether production is enabled or disabled;
   e) receiving a customer order including customer order control data;
   f) in the image production system, retrieving the image control data, the image template control data, the composite control data and the production rule data; and generating an ENABLE/DISABLE control signal by comparing the production rule data with the image control data, the image template control data and the composite control data to generate the ENABLE/DISABLE control signal; and
   g) responsive to the ENABLE/DISABLE control signal, in the image production system, employing the personal image, the image template, and the composite image construction rules to produce the composite image.

10. The method of producing composite images in an image production system claimed in claim 9, wherein the image template control data includes data selected from the group consisting of: identification of copyright owner; and identification of image template distributor, and combinations thereof.

11. The method of producing composite images in an image production system claimed in claim 9, wherein the construction rule control data includes data selected from the group consisting of: identification of the artist who created the construction rule; identification of allowable output media; identification of a construction rule generator used to create the construction rule; and identification of the particular construction rule, and combination thereof.

12. The method of producing composite images in an image production system claimed in claim 9, wherein the customer control data includes data selected from the group consisting of: identification of a customer order entry station used to create the order; identification of the business owner of the customer order entry station; and identification of a customer, and combinations thereof.

13. The method of producing composite images in an image production system claimed in claim 9, wherein the image control data includes data identifying the image as a personal image.

14. The method of producing composite images in an image production system claimed in claim 9, wherein the production rule data includes data selected from the group consisting of: identification of the production system; identification of image template owners for whom production is enabled or disabled; identification of artists creating construction rules for whom production is enabled or disabled; identification of distributors of image templates for whom production is enabled or disabled; identification of enabled product types for each image template; identification of construction rule generators for which production is enabled or disabled; identification of order entry stations for which production is enabled or disabled; identification of business owners of order entry stations for production is enabled or disabled; identification of customers and corresponding personal image codes; identification of production systems for which production is enabled or disabled; producer credit status; product expiration dates after which production of a product is disabled; geographical distribution for which production of a product is enabled or disabled; class of trade for which production of a product is enabled or disabled; and specific events for which a product is enabled or disabled, and combinations thereof.

15. The method of producing composite images in an image production system claimed in claim 9, further comprising the step of reporting production information, including billing for use of a copyright.

16. The method of producing composite images in an image production system claimed in claim 9, wherein the production rule data is password protected.

\* \* \* \* \*